United States Patent
Proctor, Jr.

(10) Patent No.: US 6,614,776 B1
(45) Date of Patent: Sep. 2, 2003

(54) FORWARD ERROR CORRECTION SCHEME FOR HIGH RATE DATA EXCHANGE IN A WIRELESS SYSTEM

(75) Inventor: James A. Proctor, Jr., Indialantic, FL (US)

(73) Assignee: Tantivy Communications, Inc., Melbourne, FL (US)

(*) Notice: Subject to any disclaimer, the term of this patent is extended or adjusted under 35 U.S.C. 154(b) by 0 days.

(21) Appl. No.: 09/301,484

(22) Filed: Apr. 28, 1999

(51) Int. Cl.[7] .............................................. H04B 7/216
(52) U.S. Cl. ...................................... 370/342; 370/320
(58) Field of Search ................................. 370/320, 328, 370/329, 334, 335, 342, 441, 535, 536, 541, 542; 375/135, 136, 137, 149, 141, 146

(56) References Cited

U.S. PATENT DOCUMENTS

| | | | |
|---|---|---|---|
| 4,460,992 A | 7/1984 | Gutleber | 370/19 |
| 4,625,308 A | 11/1986 | Kim et al. | 370/104 |
| 4,862,453 A | 8/1989 | West et al. | 370/82 |
| 4,866,709 A | 9/1989 | West et al. | 370/82 |
| 5,027,348 A | 6/1991 | Curry et al. | 370/85 |
| 5,103,459 A | 4/1992 | Gilhousen et al. | 375/1 |
| 5,115,309 A | 5/1992 | Hang | 358/133 |
| 5,394,473 A | 2/1995 | Davidson | 381/36 |
| 5,487,072 A | 1/1996 | Kant | 371/32 |
| 5,559,788 A | 9/1996 | Zscheile, Jr. et al. | 370/18 |
| 5,559,790 A * | 9/1996 | Yano et al. | 370/342 |
| 5,606,574 A | 2/1997 | Hasegawa et al. | 375/200 |
| 5,663,958 A | 9/1997 | Ward | 370/347 |
| 5,699,364 A | 12/1997 | Sato et al. | 371/5.5 |
| 5,699,369 A | 12/1997 | Guha | 371/41 |
| 5,777,990 A | 7/1998 | Zehavi et al. | 370/335 |
| 5,781,542 A | 7/1998 | Tanaka et al. | 370/342 |
| 5,805,567 A | 9/1998 | Ramesh | 370/204 |
| 5,825,807 A | 10/1998 | Kumar | 375/200 |

FOREIGN PATENT DOCUMENTS

| | | |
|---|---|---|
| EP | 0 443 061 A1 | 2/1990 |
| EP | 0 635 949 A1 | 7/1994 |
| EP | 0 827 312 A2 | 8/1997 |
| FR | 2 266 389 | 4/1974 |
| FR | 2 761 557 | 3/1997 |
| WO | WO 96/13914 | 6/1996 |
| WO | WO 98/43373 | 1/1998 |
| WO | WO 98/43373 | 10/1998 |
| WO | WO 99/44341 | 2/1999 |
| WO | WO 99/14878 | 3/1999 |
| WO | WO 99/39472 | 5/1999 |
| WO | WO 00/52831 | 9/2000 |
| WO | WO 00/65764 | 11/2000 |

OTHER PUBLICATIONS

"Wireless Personal Communications Systems", David J. Goodman, 1997.

(List continued on next page.)

Primary Examiner—Nay Maung
(74) Attorney, Agent, or Firm—Hamilton, Brook, Smith & Reynolds, P.C.

(57) ABSTRACT

A transmitter/receiver system for high data transfer in a wireless communication system includes a physical layer processor that comprises an FEC coder, a demultiplexer and a plurality of modem processors. The FEC coder applies error correction codes to the high data rate signal. Thereafter, the demultiplexer distributes portions of the coded high data rate signal to the modem processors. Each modem processor processes its respective portion of the coded signal for transmission in an independent channel.

26 Claims, 1 Drawing Sheet

OTHER PUBLICATIONS

Author Unknown, "North American Cellular System Based On Code Division Multiple Access." pp. 203–254.

Lin, S., et al., "Automatic–Repeat–Request Error–Control Schemes," *IEEE Communications Magazine,* 22(12) : pp. 5–17 (Dec. 1984).

Hagenauer, J., "Rate–Compatible Punctured Convolutional Codes (RCPC Codes) and their Applications," *IEEE Transactions on Communications,* 36 (4) : pp. 389–400 (Apr., 1988).

Shacham, N., "A Selective–Repeat–ARQ Protocol for Parallel Channels and Its Resequencing Analysis," *IEEE Transactions on Communications,* 40 (4) : pp. 773–782 (Apr., 1992).

Wang, B. C., et al., "Speed Spectrum Multiple–Access with DPSK Modulation and Diversity for Image Transmission over Indoor Radio Multipath Fading Channels," *IEEE Transactions on Circuits and Systems for Video Technology,* 6 (2) : 200–214 (1996).

* cited by examiner

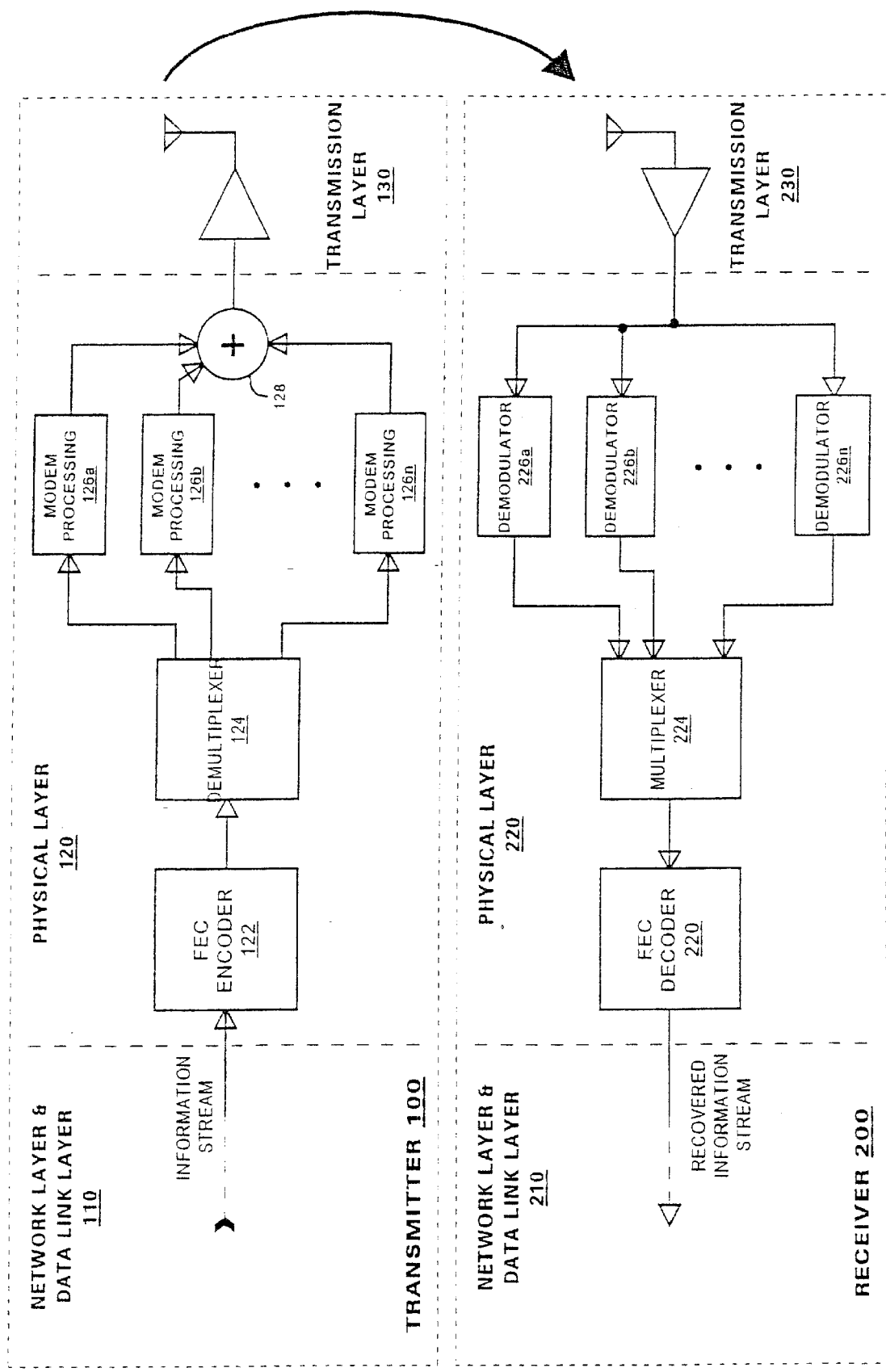

FORWARD ERROR CORRECTION SCHEME FOR HIGH RATE DATA EXCHANGE IN A WIRELESS SYSTEM

BACKGROUND

The present invention provides a low latency error correction mechanism for high data rate transmissions over multiple traffic channels in a wireless communication system.

It is known to include forward error correction ("FEC") coding and decoding to information signals that are to be transmitted over a wireless channel. Forward error correction, generally speaking, introduces predetermined redundancy into an information signal to permit a receiver to identify and perhaps correct errors that may have been introduced by a transmission medium. For example, the known IS-95 standard for code division multiple access cellular communication specifies a type of convolutional code for each traffic channel transmitted from base station to mobile station or vice versa.

Recently, it has been proposed to provide high data rate exchanges over a wireless communication system. Such high data rate exchanges may be used, for example, to facilitate data transfer for computing applications or for video conferencing applications. In one such proposal, a high rate data signal may be communicated to a receiver over a plurality of parallel traffic channels. For example, the recently proposed IS-95 B standard proposes use of parallel CDMA channels each having a data rate of 9.6 KB/s to provide a higher data rate communication. In such systems, a high rate data signal is demuliplexed into a plurality of lower rate data signals and each of these signals is processed in an independent traffic channel. Thus, each lower rate data signal has FEC applied to it.

Another example of a wireless CDMA system providing multiple parallel traffic channels for high data rate exchange may be found in the copending patent application "Protocol Conversion and Bandwidth Reduction Technique Providing Multiple nB+D ISDN Basic Rate Interface Links Over a Wireless Code Division Multiple Access Communication System," Ser. No. 09/030,049 filed Feb. 24, 1998 the disclosure of which is incorporated herein.

Wireless communication channels are inherently "noisy" due to channel impairments caused by atmospheric conditions, multipath effects, co-channel interference and the like. Particularly if used for computing applications, where executable content may be expected to be exchanged over traffic channels, the need for powerful FEC techniques will continue to be prevalent.

Use of more powerful FEC techniques in such wireless systems may increase the latency of data requests. For example, the known turbo codes require large blocks of data to be received entirely by a decoder before decoding can begin. Latency refers generally to the delay that extends from the time a request for data is issued by a user and the time when data responsive to the request is presented to the user. FEC introduces decoding delays at a wireless receiver and, thus, contributes to latency.

There is a need in the art for a wireless communication system that provides high data rate exchange having high quality FEC with low latency.

SUMMARY

Embodiments of the present invention provide a transmitter/receiver system for high data transfer in a wireless communication system in which a physical layer processor comprises an FEC coder, a demultiplexer and a plurality of modem processors. The FEC coder applies error correction codes to the high data rate signal. Thereafter, the demultiplexer distributes portions of the coded high data rate signal to the modem processors. Each modem processor processes its respective portion of the coded signal for transmission in an independent channel.

BRIEF DESCRIPTION OF THE DRAWINGS

FIG. 1 illustrates a transmitter and a receiver each constructed in accordance with embodiments of the present invention.

DETAILED DESCRIPTION

The present invention provides low latency forward error correction for a high data rate wireless transmission by applying forward error correction codes to data prior to multiplexing the data across a plurality of parallel fixed bandwidth traffic channels.

FIG. 1 is a block diagram of a transmitter 100 and a receiver 200 each constructed according to embodiments of the present invention. The transmitter 100 and receiver 200 are illustrated as operating in a layered communication system that includes a transmission layer (130, 230), a physical layer (120, 220) and higher layer communications such as network layers and data link layers (collectively labeled 110 and 210). As is known, in the transmission layer 130, a transmitter 100 performs carrier modulation, amplification and transmission upon digital data to be transmitted. Also as is known, in the transmission layer 230, a receiver 200 performs reception, amplification and carrier demodulation to obtain a recovered digital data signal. The higher layers 110, 210 of the communication system also may process an information signal as may be required for the application for which the present invention is to be used.

According to an embodiment of the present invention, the physical layer 120 of the transmitter 100 may be populated by an FEC coder 122, a demultiplexer 124 and a plurality of modem processors 126a–126n. The number of modem processors 126a–126n may vary and also may be determined by the quantity of data to be transmitted and the capacity of each of the traffic channels over which the data may be transmitted. The FEC coder 122 receives a source signal from a higher layer 110 in the transmitter and enhances it with an error correction code. The enhanced information signal is output from the FEC coder 122 to the demultiplexer 124. The demultiplexer distributes the information signal to the modem processors 126a–126n. The modem processors 126a–126n each format their respective portions of the enhanced signal for transmission. Outputs from the modem processors 126a–126n are summed by an adder 128 and delivered to the transmission layer 130.

At the receiver 200, the physical layer 220 performs processing that is the inverse of the processing that had been applied in the physical layer 120 of the transmitter 100. The physical layer 220 may be populated by an FEC decoder 222, a multiplexer 224 and a plurality of demodulators 226a–226n. There will be one demodulator 226a–226n for each of the traffic channels that had been allocated to carry the enhanced information signal. The recovered digital signal from the transmission layer 230 is input to each of the demodulators 226a–226n. Each demodulator 226a–226n outputs a recovered portion of the enhanced information signal. The multiplexer 224 merges each of the recovered portions of the enhanced information signal into a unitary recovered enhanced information signal. The FEC decoder 222 performs error detection and correction using error correction codes that had been introduced by the FEC coder 122 in the transmitter 100. The FEC decoder 222 outputs a corrected information signal to the higher layers 210 of the receiver 200.

In a CDMA embodiment, which is shown in FIG. 1, a receiver 200 need not include an element corresponding to the adder 128 of the transmitter 100; the demodulators 226a–226n each perform correlation. As is known, correlation permits a modem processor to discriminate a desired CDMA signal from other CDMA signals that may be present in an aggregate received signal. Thus, in the embodiment of FIG. 1, the demodulators 226a–226n identify and output respective portions of the recovered enhanced information signal.

According to an embodiment of the present invention, the FEC coder 122 and FEC decoder 222 may generate and decode iterative systematic nested codes, also known as "turbo" codes. These turbo codes provide an advantage in that the FEC decoding process may be repeated iteratively to improve the information signal recovered therefrom. Thus, the output of a first iteration may be reintroduced to the FEC decoding block (path not shown in FIG. 1) for subsequent iterations. The nature of the turbo codes generates improved corrected data at subsequent iterations.

The known turbo codes, however, introduce a predetermined amount of latency into the decoding process. Turbo codes operate on blocks of a predetermined size. For example, one turbo code being considered for a wireless communication system for computer network applications possesses a block size of 4,096 channel symbols. An FEC decoder 222 must decode an entire block before a recovered information signal becomes available for the block. This characteristic may be contrasted with convolutional codes which are used in the known IS-95 standard for CDMA cellular communication; convolutional codes are characterized by relatively smaller latency for same-sized block (relative to turbo codes) because it is not necessary to receive an entire block before decoding may begin. It is believed that by distributing the FEC code among several parallel traffic channels as is shown in FIG. 1, the higher aggregate throughput of the traffic channels ameliorates the latency that would otherwise be introduced by the turbo code.

For high data rate applications using plural parallel traffic channels, it is believed that use of turbo codes achieves a higher figure of merit (lower $E_b/N_o$ than for convolutional codes. Using the example of a 4,096 channel symbol sized block and $E_b/N_o$ of 1.5 dB the turbo code provides a BER of $10^{-6}$. By contrast, for voice systems requiring a less stringent $10^{-3}$ BER, a convolutional code requires an $E_b/N^o$ of 7 dB or more.

The techniques of the present invention find application in a variety of wireless communication systems including CDMA system. Typically, in application, the base stations and subscriber stations of the wireless communication system will include functionality of both the transmitter and receiver of FIG. 1. That is, to provide two-way communication, a base station will include a transmitter portion 100 and a receiver portion 200. So, too, with the subscriber terminal. The base stations and subscriber terminals may but need not be configured to provide simultaneous full-duplex communication.

Typically, a base station of a wireless communication system transmits a plurality of data signals to a variety of subscribers simultaneously. According to an embodiment of the present invention, each base station may perform the techniques disclosed herein simultaneously on a number of high rate data signals. It is consistent with the spirit and scope of the present invention that each signal may have a date rate that is independent of the data rates of the other signals. Thus, in such a case, a base station may be configured to include its FEC coder/decoders 122, 222 and modem processor/demodulators 126a, 226a in a pooled configuration. Such an embodiment permits the base station to assign, for example, a variable number of modem processors 126a–126n to a data signal depending upon the rate of the signal to be transmitted. Similarly, by including a pool of FEC coders 122 (shown singly in FIG.1) in a base station, the base station may selectively enable FEC coders 122 as the base station receives new data signals to be transmitted to subscribers. Provision of base station processing components in a pooled arrangement is well-known.

Several embodiments of the present invention are specifically illustrated and described herein. However, it will be appreciated that modifications and variations of the present invention are covered by the above teachings and within the purview of the appended claims without departing from the spirit and intended scope of the invention.

I claim:

1. In a CDMA (Code Division Multiple Access) transmitter, a physical layer processor comprising:
    a source signal including data;
    an FEC (Forward Error Correction) coder to receive the source signal and produce an enhanced source signal including data coded with error correction information;
    a demultiplexer coupled to receive the enhanced source signal from the FEC coder;
    a plurality of modem processors, each of which is coupled to a unique output of the demultiplexer to process respective portions of the enhanced source signal in independent channels;
    an adder coupled to receive outputs of the modem processors to produce an aggregate signal, the aggregate signal being a summation of the enhanced signal processed in independent channels; and
    a transmitter to transmit the aggregate signal over a carrier frequency.

2. The CDMA transmitter of claim 1 provided in a base station of a CDMA communication system.

3. The CDMA transmitter of claim 1 provided in a subscriber station of a CDMA communication system.

4. The CDMA transmitter of claim 1, wherein the FEC coder operates according to an iterative systematic nested code.

5. The CDMA transmitter of claim 1, wherein the FEC coder operates according to a turbo product code.

6. The CDMA transmitter of claim 1, wherein the FEC coder according to a convolutional turbo code.

7. An apparatus as in claim 1, wherein the aggregate signal is modulated onto a common carrier frequency.

8. In a CDMA receiver, a physical layer processor comprising:
    a receiver that receives a wireless signal from a transmitter, the wireless signal being formed at the transmitter by a summation of portions of a coded signal that were processed in independent channels but were wirelessly transmitted as a single aggregate signal;
    a plurality of demodulators coupled to receive an output of the receiver; and a multiplexer coupled to direct an output of the demodulators to an FEC (Forward Error Correction) decoder to recover a single unitary information signal.

9. The CDMA receiver of claim 8 provided in a base station of a CDMA communication system.

10. The CDMA receiver of claim 8 provided in a subscriber station of a CDMA communication system.

11. The CDMA receiver of claim 8, wherein the FEC decoder operates according to an iterative systematic nested code.

12. The CDMA receiver of claim 8, wherein the FEC decoder operates according to a turbo product code.

13. The CDMA receiver of claim 8, wherein the FEC coder according to a convolutional turbo code.

14. An apparatus as in claim 8, wherein the aggregate signal is modulated onto a common carrier frequency.

15. A physical layer signal processor for use in transmitting a Code Division Multiple Access (CDMA) encoded signal, the signal processor comprising:
   a Forward Error Correction (FEC) encoder, connected to receive a source signal, and to apply an error correction code;
   a demultiplexer in communication with the FEC encoder, the demultiplexer outputting two or more demultiplexed encoded signals;
   a plurality of modem processors, each receiving a respective one of the plurality of the demultiplexed encoded signals, the modem processors each modulating a respective one of the demultiplexer outputs applied thereto to produce a respective one of a plurality of transmission code modulated signals, the signal processor further characterized by:
   an adder that is connected to receive the plurality of transmission code modulated signals to thereby produce an aggregate signal; and
   a transmitter connected to receive the aggregate signal output by the adder, for producing an aggregate transmitted signal.

16. The processor of claim 15 provided in a base station of a CDMA communication system.

17. The processor of claim 15 provided in a subscriber station of a CDMA communication system.

18. The processor of claim 15, wherein the FEC encoder operates according to an iterative systematic nested code.

19. The processor of claim 15, wherein the FEC encoder operates according to a turbo product code.

20. The processor of claim 15, wherein the FEC encoder encodes according to a convolutional turbo code.

21. A method for transmitting a high data rate signal over a wireless radio channel comprising the steps of:
   enhancing the high data rate signal with the Forward Error Correction (FEC) code;
   distributing the enhanced high data rate signal over a plurality of demultiplexed signals;
   encoding each of the plurality of demultiplexed signals with a Code Division Multiple Access (CDMA) transmission code;
   characterized by the additional steps of:
      summing the plurality of CDMA transmission encoded signals to produce an aggregate signal; and
      modulating the aggregate signal, to produce a transmitted signal.

22. The method of claim 21 in which the transmitted signal is provided to a base station of a CDMA communication system.

23. The method of claim 21 in which the transmitted signal is provided to a subscriber station of a CDMA communication system.

24. The method of claim 21, wherein the FEC decoder operates according to an iterative systematic nested code.

25. The method of claim 21, wherein the FEC decoder operates according to a turbo product code.

26. The method of claim 21, wherein the FEC decoder operates according to a convolutional turbo code.

* * * * *

UNITED STATES PATENT AND TRADEMARK OFFICE
CERTIFICATE OF CORRECTION

PATENT NO.   : 6,614,776 B1                                              Page 1 of 1
DATED        : September 2, 2003
INVENTOR(S)  : James A. Proctor, Jr.

It is certified that error appears in the above-identified patent and that said Letters Patent is hereby corrected as shown below:

Column 4,
Line 55, after "coder" insert -- operates --;
Line 55, after "convolutional" insert -- or --.

Column 5,
Line 14, after "coder" insert -- operates --;
Line 14, after "convolutional" insert -- or --.

Column 6,
Lines 10 and 36, after "convolutional" insert -- or --.

Signed and Sealed this

Sixth Day of January, 2004

JAMES E. ROGAN
*Director of the United States Patent and Trademark Office*

(12) EX PARTE REEXAMINATION CERTIFICATE (8260th)
United States Patent
Proctor, Jr.

(10) Number: US 6,614,776 C1
(45) Certificate Issued: May 24, 2011

(54) FORWARD ERROR CORRECTION SCHEME FOR HIGH RATE DATA EXCHANGE IN A WIRELESS SYSTEM

(75) Inventor: James A. Proctor, Jr., Indialantic, FL (US)

(73) Assignee: Tantivy Communications, Inc., Wilmington, DE (US)

Reexamination Request:
No. 90/008,982, Jan. 15, 2008

Reexamination Certificate for:
Patent No.: 6,614,776
Issued: Sep. 2, 2003
Appl. No.: 09/301,484
Filed: Apr. 28, 1999

Certificate of Correction issued Jan. 6, 2004.

(51) Int. Cl.
*H04B 7/216* (2006.01)

(52) U.S. Cl. .................................. 370/342; 370/320
(58) Field of Classification Search .................. None
See application file for complete search history.

(56) References Cited

U.S. PATENT DOCUMENTS

| | | |
|---|---|---|
| 5,373,502 A | 12/1994 | Turban |
| 5,410,538 A | 4/1995 | Roche et al. |
| 5,414,728 A | 5/1995 | Zehavi |
| 5,442,625 A | 8/1995 | Gitlin et al. |
| 5,602,834 A | 2/1997 | Dean et al. |
| 5,608,725 A | 3/1997 | Pendleton et al. |
| 5,663,990 A | 9/1997 | Bolgiano et al. |
| 5,673,259 A | 9/1997 | Quick, Jr. |
| 5,734,646 A | 3/1998 | I et al. |
| 5,784,406 A | 7/1998 | DeJaco et al. |
| 5,790,551 A | 8/1998 | Chan |
| 5,828,659 A | 10/1998 | Teder et al. |
| 5,828,662 A | 10/1998 | Jalali et al. |
| 5,844,894 A | 12/1998 | Dent |
| 5,856,971 A | 1/1999 | Gitlin et al. |
| 5,859,840 A | 1/1999 | Tiedemann, Jr. et al. |
| 5,910,945 A | 6/1999 | Garrison et al. |
| 5,914,950 A | 6/1999 | Tiedemann, Jr. et al. |
| 5,917,852 A | 6/1999 | Butterfield et al. |
| 5,923,650 A | 7/1999 | Chen et al. |

(Continued)

FOREIGN PATENT DOCUMENTS

| | | |
|---|---|---|
| EP | 0720309 | 7/1996 |
| WO | 95/08900 | 3/1995 |
| WO | 96/27250 | 9/1995 |
| WO | 97/26726 | 7/1997 |
| WO | 98/59447 | 12/1998 |
| WO | WO 99/09674 | * 2/1999 |

OTHER PUBLICATIONS

Kaiser, Stefan and Hagenauer, Joachim. *Multi–Carrier CDMA with Iterative Decoding and Soft–Interference Cancellation;* IEEE Global Communications Conference, Phoenix, AZ, USA, Nov. 3–8, 1997, vol. I: 523–529.

I, Chih–Lin and Gitlin, Richard D. *Multi–Code CDMA Wireless Personal Communications Networks;* Proceedings IEEE ICC 1995: 1060–1064.

Attachment 2, High Speed Data RLP Lucent Technologies, Version 0.1, Jan. 16, 1997.

(Continued)

*Primary Examiner* — Colin M LaRose

(57) ABSTRACT

A transmitter/receiver system for high data transfer in a wireless communication system includes a physical layer processor that comprises an FEC coder, a demultiplexer and a plurality of modem processors. The FEC coder applies error correction codes to the high data rate signal. Thereafter, the demultiplexer distributes portions of the coded high data rate signal to the modem processors. Each modem processor processes its respective portion of the coded signal for transmission in an independent channel.

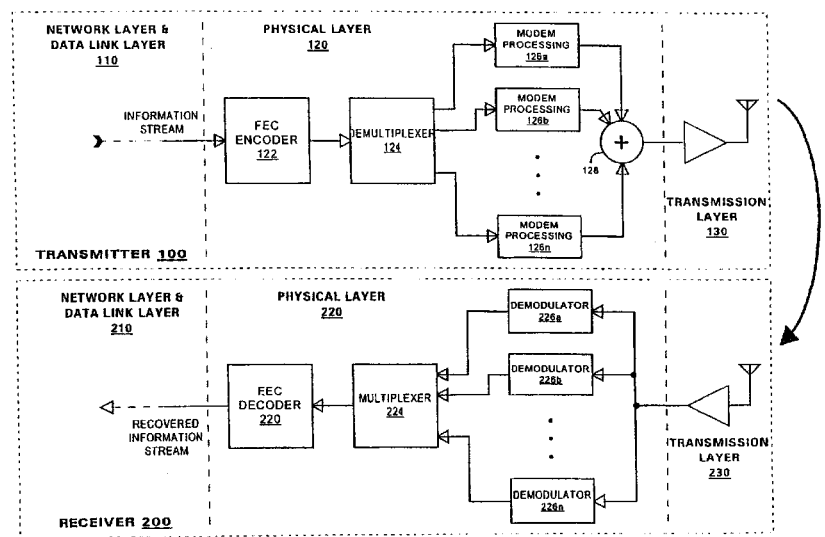

U.S. PATENT DOCUMENTS

| | | | |
|---|---|---|---|
| 5,930,230 A | 7/1999 | Odenwalder et al. | |
| 5,950,131 A | 9/1999 | Vilmur | |
| 5,991,279 A | 11/1999 | Haugli et al. | |
| 6,005,855 A | 12/1999 | Zehavi et al. | |
| 6,028,868 A | 2/2000 | Yeung et al. | |
| 6,064,678 A | 5/2000 | Sindhushayana et al. | |
| 6,069,883 A | 5/2000 | Ejzak | |
| 6,078,572 A | 6/2000 | Tanno et al. | |
| 6,088,335 A | 7/2000 | I et al. | |
| 6,104,708 A | 8/2000 | Bergamo | |
| 6,112,092 A | 8/2000 | Benveniste | |
| 6,134,233 A | 10/2000 | Kay | |
| 6,151,332 A | 11/2000 | Gorsuch et al. | |
| 6,157,619 A | 12/2000 | Ozluturk et al. | |
| 6,161,013 A | 12/2000 | Anderson et al. | |
| 6,208,871 B1 | 3/2001 | Hall et al. | |
| 6,215,798 B1 | 4/2001 | Carneheim et al. | |
| 6,222,828 B1 | 4/2001 | Ohlson et al. | |
| 6,243,372 B1 | 6/2001 | Petch et al. | |
| 6,259,683 B1 | 7/2001 | Sekine et al. | |
| 6,262,980 B1 | 7/2001 | Leung et al. | |
| 6,269,088 B1 | 7/2001 | Masui et al. | |
| 6,272,168 B1 | 8/2001 | Lomp et al. | |
| 6,285,665 B1 | 9/2001 | Chuah | |
| 6,298,463 B1 * | 10/2001 | Bingeman et al. | 714/786 |
| 6,307,840 B1 | 10/2001 | Wheatleyl, III et al. | |
| 6,366,570 B1 | 4/2002 | Bhagalia | |
| 6,373,830 B1 | 4/2002 | Ozluturk | |
| 6,373,834 B1 | 4/2002 | Lundh et al. | |
| 6,377,548 B1 | 4/2002 | Chuah | |
| 6,377,809 B1 | 4/2002 | Rezaiifar et al. | |
| 6,389,000 B1 | 5/2002 | Jou | |
| 6,396,804 B2 | 5/2002 | Odenwalder | |
| 6,418,148 B1 | 7/2002 | Kumar et al. | |
| 6,456,608 B1 | 9/2002 | Lomp | |
| 6,469,991 B1 | 10/2002 | Chuah | |
| 6,473,417 B1 * | 10/2002 | Herzog | 370/342 |
| 6,473,623 B1 | 10/2002 | Benveniste | |
| 6,504,830 B1 | 1/2003 | Östberg et al. | |
| 6,519,651 B1 | 2/2003 | Dillion | |
| 6,526,039 B1 | 2/2003 | Dahlman et al. | |
| 6,532,365 B1 | 3/2003 | Anderson et al. | |
| 6,545,986 B1 | 4/2003 | Stellakis | |
| 6,567,416 B1 | 5/2003 | Chuah | |
| 6,570,865 B2 | 5/2003 | Masui et al. | |
| 6,571,296 B1 | 5/2003 | Dillion | |
| 6,574,211 B2 | 6/2003 | Padovani et al. | |
| 6,597,913 B2 | 7/2003 | Natarajan | |
| 6,885,652 B1 | 4/2005 | Ozukturk et al. | |
| 6,940,840 B2 | 9/2005 | Ozluturk et al. | |

OTHER PUBLICATIONS

Azad et al., "Multirate Spread Spectrum Direct Sequence CDMA Techniques," 1994, The Institute of Electrical Engineers.

Bell Labs Technical Journal, Lucent Technologies, vol. 2, No. 3, Summer 1997.

Budka et al., "Cellular Digital Packet Data Networks," Bell Labs Technical Journal, Summer 1997, pp. 164–181.

Cellular Digital Packet Data, System Specification, Release 1.1 Jan. 19, 1995.

Chen Q et al., "Multicarrier CDMA With Adaptive Frequency Hopping For Mobile Radio Systems", IEEE Journal on selected areas in communications, vol. 14, No. 9, Dec. 1996, pp. 1852–1858, XP000639647.

Chung, "Packet Synchronization and Identification for Incremental Redundancy Transmission in FH–CDMA Systems," 1992, IEEE, pp. 292–295.

Data Service Options for Wideband Spread Spectrum Systems. TIA/EIA Interim Standard. TIA/EIA/IS–707–A. Apr. 1999.

Data Service Options for Wideband Spread Spectrum Systems: Introduction, PN–3676. I (to be published as TIA/EIA/IS–707.1), Mar. 20, 1997 (Content Revision 1).

Data Service Option For Wideband Spread Spectrum Systems, TIA/EIA Interim Standard, TIA/EIA/IS 707.

Data Services Option Standard for Wideband Spread Spectrum Digital Cellular System. TIA/EIA/IS–99. TIA/EIA Interim Standard. Jul. 1995.

Data Services Options Standard for Wideband Spread Spectrum Systems: Packet Data Services. PN–3676.5 (to be published as TIA/EIA/IS–707.5) Ballot Version, May 30, 1997.

Data Standard, Packet Data Section, PN–3676.5 (to be published as TIA/EIA/IS–DATA.5), Dec. 8, 1996, Version 02 (Content Revision 03).

Draft Text for "95C" Phyical Layer, (Revision 4), Part 1, Document #531–981–20814–95C, part 1 on 3GGP2 website (ftp://ftp.3ggp2.org/tsgc/working/1998/1298_Maui/WG3–TG1/531–9812014–95c,%20part5202.pdf, 1998).

Ejzak et al., "Lucent Technologies Air Interface Proposal for CDMA High Speed Data Service," Revision 0.1, May 5, 1997.

Ejzak et al., "Lucent Technologies Air Interface Proposal for CDMA High Speed Data Service," Apr. 14, 1997.

Ejzak, et al. "Proposal for High Speed Packet Data Service, Version 0.1," Lucent Technologies, Jan. 16, 1997.

Elhakeem, "Congestion Control in Signaling Free Hybrid ATM/CDMA Satellite Network," IEEE, 1995, pp. 783–787.

Hall et al., "Design and Analysis of Turbo Codes of Rayleigh Fading Channels," IEEE Journal on Selected Areas in Communications, vol. 16, no. 2, Feb. 1998, pp. 160–174.

High Data Rate (HDR) Solution, Qualcomm, Dec. 1998.

High Data Rate (HDR), cdmaOne optimized for high speed, high capacity data, Wireless Infrastructure, Qualcomm, Sep. 1998.

Hindelang et al., "Using Powerful "Turbo" Codes for 14.4 Kbit/s Data Service in GSM or PCS Systems," IEEE Global Communications Conference, Phoenix, Arizona, USA Nov. 3–8, 1997 vol. 11, pp. 649–653.

Honkasalo, Harri, "High Speed Data Air Interface," 1996.

I et al., "IS–95 Enhancements for Multimedia Services," Bell Labs Technical Journal, pp. 60–87, Autumn 1996.

I et al., "Load and Interference Based Demand Assignment (LIDA) for Integrated Services in CDMA Wireless Systems," Nov. 18, 1996, pp. 235–241.

I et al., "Performance of Multi–Code CDMA Wireless Personal Communications Networks," Jul. 25, 1995.

I et al., "Variable Spreading Gain CDMA with Adaptive Control for True Packet Switching Wireless Network," 1995, pp. 725–730.

Knisely, "Telecommunications Industry Association Subcommittee TR–45.5—Wideband Spread Spectrum Digital Technologies Standards," Banff, Alberta. Feb. 24, 1997 (TR45.5/97.02.24)21.

Knisely, "Telecommunications Industry Association Subcommittee TR–45.5—Wideband Spread Spectrum Digital Technologies Standards," Working Group III—Physical Layer. Banff, Alberta. Feb. 24, 1997 (TR45.5/97.02.24)22.

Knisely, "Lucent Technologies Air Interface Proposal for CDMA High Speed Data Service," Jan. 16, 1997.

Kryzmien et al., "Rapid Acquisition Algorithms for Synchronization of Bursty Transmissions in CDMA Microcellular and Personal Wireless Systems," IEEE Journal on Selected Areas in Communications, vol. 14, No. 3, Apr. 1996, pp. 570–579.

Kumar et al., "An Access Scheme for High Speed Packet Data Service on IS–95 based CDMA," Feb. 11, 1997.

Liu et al., "Channel Access and Interference Issues in Multi–Code DS–CDMA Wireless Packet (ATM) Networks," Wireless Networks 2, pp. 173–196, 1996.

Lucent Technologies Presentation First Slide Titled, Summary of Multi–Channel Signaling Protocol, Apr. 6, 1997.

Lucent Technologies Presentation First Slide Titled, Why Support Symmetric HSD (Phase 1C), Feb. 21, 1997.

Mobile Station–Base Station Compatibility Standard for Dual–Mode Wideband Spread Spectrum Cellular System, TIA Interim Standard, TIA/EIA/IS–95–A (Addendum to TIA/EIA/IS–95), May 1995.

Mobile Station–Base Station Compatibility Standard for Wideband Spread Spectrum Cellular Systmes, TIA/EIA Standard, TIA/EIA–95–B (Upgrade and Revision of TIA/EIA–95–A), Mar. 1999.

Motorola, Version 1.0. Motorola High Speed Data Air Interface Proposal Comparisions and Recommendations. Jan. 27, 1997.

MSC–BS Interface (A–Interface) for Public 800 MHz. TIA/EIA/IS–634–A. TIA/EIA Interim Standard (Revision of TIA/EIA/IS–634) Jul. 1998.

MSC–BS Interface for Public 800 MHz. TIA/EIA/IS–634. TIA/EIA Interim Standard, Dec. 1995.

Network Wireless Systems Offer Business unit (NWS OBU), Feature Definition Document for Code Division Multiple Access (CDMA) Packet Mode Data Services, FDD–1444, Nov. 26, 1996.

Ott, "TR45.5, CDMA WBSS Technical Standards Meeting Summary," Feb. 24–28, 1997 Banff, Alberta.

Packet Data service Option Standard for Wideband Spread Spectrum Systems, TIA/EIA Interim Standard, TIA/EIA/IS–657, Jul. 1996.

Pulleston, "PPP Protocol Spoofing Control Protocol," Global Village Communication (UK) Ltd., Feb. 1996.

Reed et al., "Iterative Multiuser Detection for CDMA with FEC: Near–Single–User Performance," IEEE Transactions on Communications, vol. 46, No. 12, Dec. 1998, pp. 1693–1699.

Simpson, W. (Editor). "RFC 1661—The Point–to–Point Protocol (PPP)." Network Working Group, Jul. 1994, pp. 1–35. http://www.faqs.org/rfcs/rfc1661.html.

Simpson, W. (Editor). "RFC 1662—PPP in HDLC–Like Framing." Network Working Group, Jul. 1994, pp. 1–17. http://www.faqs.org/rfcs/rfc1662.html.

Stage 1 Service Description for Data Services—High Speed Data Services (Version 0.10) CDG RF 38. Dec. 3, 1996.

Support for 14.4 kbps Data Rate and PCS Interaction for Wideband Spread Spectrum Cellular Systems. TSB74, Dec. 1995. TIA/EIA Telecommunications Systems Bulletin.

Telecommunications Industry Association Meeting Summary. Task Group I, Working Group III, Subcommittee TR45.5. Feb. 24–27, 1997. Banff, Alberta.

Telecommunications Industry Association Meeting Summary. Task Group I, Working Group III, Subcommittee TR45.5. Jan. 6–8, 1997. Newport Beach, California. (Tiedemann, pp. 4–8).

Third Generation Partnership Project, "Technical Specification Group (TSG) Radio Access Network (RAN); Working Group 1 (WG1); Physical Channels and Mapping of Transport Channels onto Physical Channels (FDD)," 3GPP TS 25.211 v2.0.0 (Apr. 1999).

Third Generation Partnership Project, "Technical Specification Group (TSG) Radio Access Network (RAN); Working Group 1 (WG1); Multiplexing and Channel Coding (FDD)," 3GPP TS 25.212 v1.0.0 (Apr. 1999).

Third Generation Partnership Project, "Technical Specification Group (TSG) Radio Access Network (RAN); Working Group 1 (WG1); Spreading and Modulation (FDD)," 3GPP TS 25.213 v2.0.0 (Apr. 1999).

Viterbi, "The Path to Next Generation Services with CDMA Qualcomm Incorporated," 1998 CDMA Americas Congress, Los Angeles, California, Nov. 19, 1998.

Viterbi, "A Constructive (Backward Compatible) Approach for Migration to Wider Band Wireless Services," Qualcomm Incorporated, 3rd Generation Wider Band CDMA Technology Conference, Atlanta, Georgia, Feb. 25, 1998.

Wang et al., "The Performance of Turbo–Codes in Asynchronous DS–CDMA," IEEE Global Communications Conference, Phoeniz, Arizona, USA, Nov. 3–8, 1997, vol. III, pp. 1548–1551.

WWW.CDG.ORG/NEWS/PRESS/1997.ASP. CDA Press Release Archive, 1997.

Author Unknown, "North American Cellular System Based On Code Division Multiple Access." pp. 203–254.

Draft Text for "95C" Phyical Layer. (Revision 4), Part 2, Document #531–981–20814–95C, part 2 on 3GGP2 website (ftp://ftp.3ggp2.org/tsgc/working/1998/1298_Maui/WG3–TG1/531–9812014–95c,%20part5202.pdf, 1998).

Hagenauer, "Rate–Compatible Puncture Convolutional Codes (RCPC Codes) and their Applications," IEEE Transactions on Communications, 35 (4): pp. 389–400 (Apr. 1988).

Lin, S., et al., "Automatic–Repeat–Request Error–Control Schemes," IEEE Communications Magazine, 22 (12): pp. 5–17 (Dec. 1984).

Shacham, N., "A Selective–Repeat–ARQ Protocol for Parallel Channels and Its Resequencing Analysis," IEEE Transactions on Communications, 40 (4): pp. 773–782 (Apr. 1992).

Wang, et al, "Spread Spectrum Multiple–Access with DPSK Modulation and Diversity for Image Transmission over Indoor Radio Multipath Fading Channels," IEEE Transactions on Circuits and Systems for Video Technology, 6 (2): 200–214 (1996).

* cited by examiner

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1-7 and 15-26 are cancelled.
Claims 8-14 were not reexamined.

\* \* \* \* \*